(12) United States Patent
Blake-Wilson et al.

(10) Patent No.: US 6,336,188 B2
(45) Date of Patent: *Jan. 1, 2002

(54) AUTHENTICATED KEY AGREEMENT PROTOCOL

(75) Inventors: Simon Blake-Wilson, Alton (GB); Donald Johnson, Manassas, VA (US); Alfred Menezes, Mississauga (CA)

(73) Assignee: Certicom Corp., Ontario (CA)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/070,794

(22) Filed: May 1, 1998

(51) Int. Cl.$^7$ ................................................ H04L 9/00
(52) U.S. Cl. ........................ 713/171; 380/44; 380/277
(58) Field of Search ............................ 380/21, 25, 277, 380/44, 283, 284, 285, 30; 713/171

(56) References Cited

U.S. PATENT DOCUMENTS

| | | | | |
|---|---|---|---|---|
| 4,956,863 A | * | 9/1990 | Goss | 380/30 |
| 5,142,578 A | * | 8/1992 | Matyas et al. | 380/21 |
| 5,588,060 A | * | 12/1996 | Aziz | 380/30 |
| 5,657,390 A | * | 8/1997 | Elgamal et al. | 380/49 |
| 5,889,865 A | * | 3/1999 | Vanstone et al. | 713/171 |
| 5,896,455 A | * | 4/1999 | Vanstone et al. | 380/21 |

OTHER PUBLICATIONS

Schneier, Applied Cryptography 2nd Ed., pp. 513–522 and pp. 31–34, 1996.*
"New Directions in Cryptography", IEEE Transactions on Information Theory, Nov. 1976.

* cited by examiner

Primary Examiner—Phung M. Chung
Assistant Examiner—Steve Kabakoff
(74) Attorney, Agent, or Firm—Finnegan, Henderson, Farabow, Garrett & Dunner, L.L.P.

(57) ABSTRACT

A key agreement method between a pair of entities i and j in a digital communication system, wherein each the entity has a private and corresponding public key pair $S_i, P_i$ and $S_j, P_j$ respectively and the system, having global parameters for generating elements of a group, the method comprising the steps of:

(a) entity i selecting a random private session value $R_i$;
(b) forwarding a public session value corresponding to the private session value $R_i$ to the entity j;
(c) entity j computing a long term shared secret key k' derived from entity i's public key and j's private key utilizing a first function $H_1$;
(d) the entity j utilizing entity j utilizing the key' and computing an authenticated message on entity identities i,j and entities public session keys and forwarding the aunthenticated message to entity i;
(e) the entity i verifying the received authenticated message;
(f) the entity i computing the long term shared secret key k' derived from the entity j's public key and i's private key in accordance with the first function $H_1$;
(g) the entity i utilizing the long term shared secret key k' and computing an authenticated message on the entities i and j identity information and the entities public session keys and forwarding the authenticated message to the entity j;
(h) entity j verifying the received authenticated message; and
(i) upon both the entities i and j verifying the authenticated message, computing a short term shared secret key utilizing a respective entity's session public and private keys.

1 Claim, 3 Drawing Sheets

PROTOCOL 1

PROTOCOL 3

PROTOCOL 4

AUTHENTICATED KEY AGREEMENT PROTOCOL

This invention relates to cryptographic systems and in particular, to authenticated key agreement protocols used in the cryptographic systems.

A key agreement problem exists when two entities wish to agree on keying information in secret over a distributed network. Solutions to the key agreement problem whose security is based on a Diffie-Hellman problem in finite groups have been used extensively.

Suppose however, that entity i wishes to agree on secret keying information with entity j. Each party desires an assurance that no party, other tan i and j, can possibly compute the keying information agreed upon. This may be termed the authenticated key agreement (AK) problem. Clearly, this problem is harder than the key agreement problem in which i does not care which entity it is agreeing on a key with, for in this problem i stipulates that the key may be shared with j and no other entity.

Several techniques related to the Diffie-Hellman problem have been proposed to solve the AK problem. However, no practical solutions have been provably demonstrated to achieve this goal and this deficiency has led, in many cases, to the use of flawed protocols.

Since in the AK problem, i merely desires that only j can possibly compute the key and not that j has actually computed the key, solutions are often said to provide implicit (key) authentication. If i wants to make sure, in addition, that j really has computed the agreed key, then key confirmation is incorporated into the key agreement protocol leading to so-called explicit authentication. The resulting goal is called authenticated key agreement with key confirmation (AKC). It may be seen that key confirmation essentially adds the assurance that i really is communicating with j. Thus, the goal of key confirmation is similar to the goal of entity authentication as defined in Diffie-Hellman. More precisely however, the incorporation of entity authentication into the AKA protocol provides i the additional assurance that j can compute the key, rather than the stronger assurance that j has actually computed the key.

A number of distinct types of attacks have been proposed against previous schemes. There are two major attacks which a protocol should withstand. The first is a passive attack, where an adversary attempts to prevent a protocol from achieving its goal by merely observing honest entities carrying out the protocol. The second is an active attack where an adversary additionally subverts the communication themselves in any way possible by injecting messages, intercepting messages, replaying messages, altering messages and the like.

It is thus essential for any secure protocol to withstand both passive and active attacks since an adversary can reasonably be assumed to have these capabilities in a distributed network.

It is therefore desirable to provide a key agreement protocol that mitigates at least some of the above advantages.

SUMMARY OF THE INVENTION

A key agreement method between a pair of entities i and j in a digital data communication system, wherein each said entity has a private and corresponding public key pairs $S_i$, $P_i$ and $S_j$, $P_j$ respectively and the system, having global parameters for generating elements of a group, said method comprising the steps of:

(a) entity i selecting a random private session value $R_i$;

(b) forwarding a public session value corresponding to said private session value $R_i$ to said entity j;

(c) entity j computing a long term shared secret key k' derived from entity i's public key and j's private key utilizing a first function $H_j$;

(d) said entity j utilizing entity j utilizing said key k' and computing an authenticated message on entity identities i, j and entities public session keys and forwarding said authenticated message to entity i;

(e) said entity i verifying said received authenticated message;

(f) said entity i computing said long term shared secret key k' derived from said entity j's public key and i's private key in accordance with said first function HI;

(g) said entity i utilizing said long term shared secret key k' and computing an authenticated message on said entities i and j identity information and said entities public session keys and forwarding said authenticated message to said entity j;

(h) entity j verifying said received authenticated message; and (i) upon both said entities i and j verifying said authenticated message, computing a short term shared secret key utilizing a respective entity's session public and private keys.

BRIEF DESCRIPTION OF THE DRAWINGS

These and other features of the preferred embodiments of the invention will become more apparent in the following detailed description in which reference is made to the appended drawings wherein.

DESCRIPTION OF THE PREFERRED EMBODIMENTS

In the following discussion, the notation as outlined below is utilized and described more fully in the Diffie-Hellman paper entitled "New Directions in Cryptography", IEEE Transactions on Information Theory, November 1976, and incorporated herein by reference.

Figure 1:
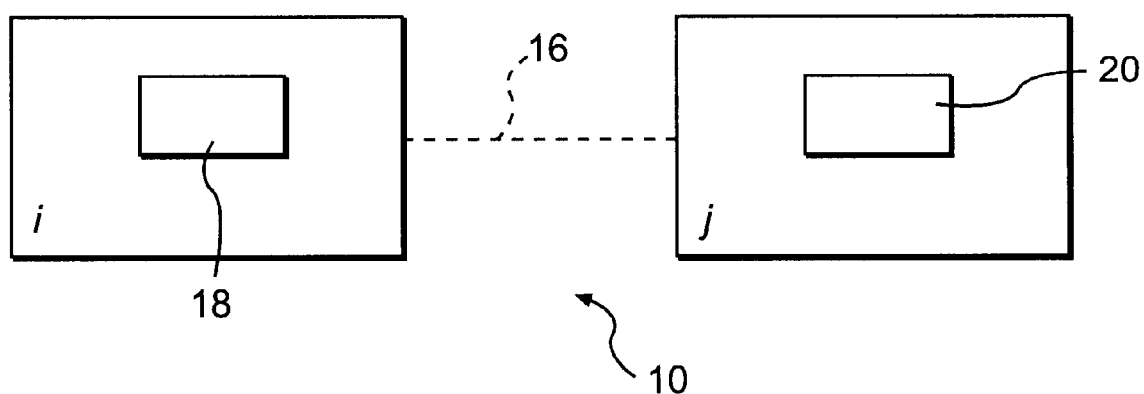
FIG. 1 is a schematic diagram of a digital data communication system.

Referring to FIG. 1, a data communication system 10 includes a pair of entities or correspondents, designated as a sender i and a recipient j who are connected by a communication channel 16. Each of the correspondents, i and j includes an encryption unit 18, 20 respectively that may process digital information and prepare it for transmission through channel 16 as will be described below. Furthermore, the encryption units may be either a dedicated processor or a general purpose processor including software for programming the general purpose computer to perform specific cryptographic functions.

In the following discussion, $k_{ij}$ is i's key pair $k_i$ together with j's public value, tran is a transcript of the ordered set of messages transmitted and received by i and j is the agreed key.

The protocols are described in terms of arithmetic operations in a subgroup generated by an element o f prime order q in the multiplicative group $Z_p^* = \{1, 2, \ldots, p-1\}$ where p is a prime. In each case, an entity's private value is an element $S_i$ of $Z_q^* = \{1, 2, \ldots q-1\}$, and the corresponding public value is $P_i = \alpha^{S_i} \text{MOD}_p^2$, so that i's key pair is $K_i = (S_i,$ $P_j$). It is to be noted that the protocols can be described equally well in terms of the arithmetic operations in any finite group and, of course, this would require the conversion of the security assumptions on the Diffie-Hellman problem of that group. Furthermore, any particular run of a protocol is called a session. For example, the keying information agreed in the course of a protocol run is referred to as a session key. The individual messages that form a protocol run are called flows.

The protocols as described below employ various primitives. Of these primitives, the two primitives used are message authentication codes (MAC) and Diffie-Hellman schemes (DHS). Of course, some applications may wish to use another primitive to achieve confirmation. For example, if the agreed session key is later to be used for encryption, it seems sensible to employ an encryption scheme to achieve key confirmation rather than waste time implementing a MAC.

Figure 2:
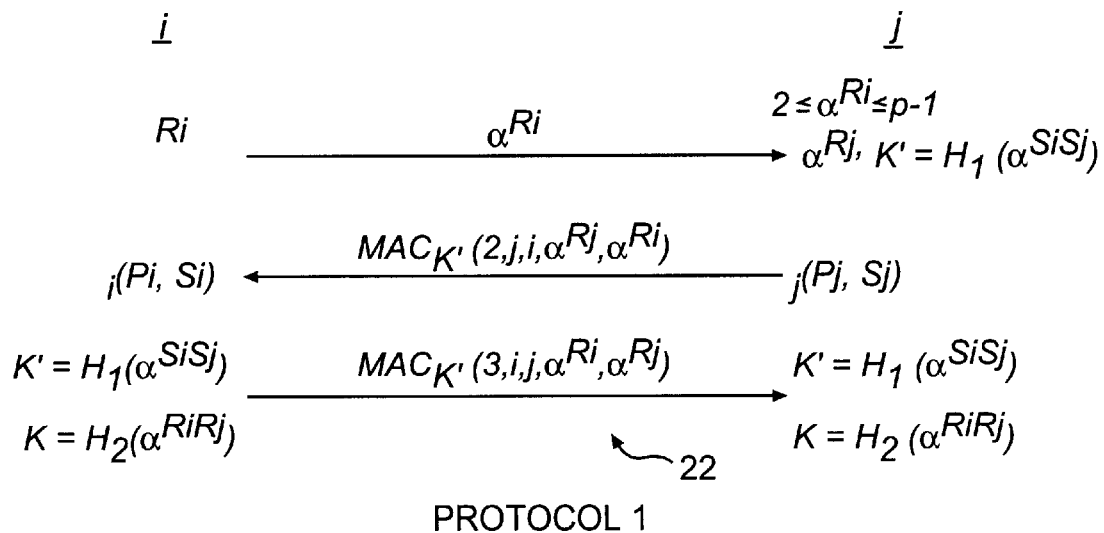
FIGS. 2, 3, 4 and 5, are embodiments of a key agreement protocol according to the present invention.

Referring now to FIG. 2, a graphical representation of a first embodiment of an AKC protocol (Protocol 1) according to the present invention is shown generally by the numeral 22. We use $\epsilon_R$ to denote an element chosen independently at random, and commas to denote a unique encoding through concatenation (or any other unique encoding). Let $H_1$ and $H_2$ represent independent random oracles and (p,q,) are global parameters. The random oracles may be defined in terms of coin tosses in the following way. It is assumed that all parties are provided with a black-box random function H(.): $\{0,1\}^k \rightarrow \{0,1\}^k\}$. When H is queried for the first time, say on string x, it returns the string of length k corresponding to its first k coin tosses as H(x). When queried with a second string say x', first H compares x and x'. If x'=n, H again returns its first k coin tosses H(n). Otherwise H returns its second k tosses as H(x'). In instantiations, H is generally modeled by a hash function H. When entity i wishes to initiate a run of P with the entity j,i selects an element at random $R_i \epsilon_R Z_q^*$ and sends $\alpha^{R_i}$ to j. On receipt of this string,j checks that $2 \leq \alpha^{R_i} \leq p-1$ and $(\alpha^{R_i})^q=1$, then j chooses $R_j \epsilon_R Z_q^*$, and computes $\alpha^{R_j}$ and k'=$H_1(\alpha^{S_iS_j})$. Finally, j uses k'to compute $MAC_k$, $(2,i,j,\alpha^{R_j}i,\alpha^{R_i})$, and sends this authenticated message to i. (Recall that $MAC_k$, (m) represents the pair (m,$\alpha$), not just the tag $\alpha$). On receipt of this string, i checks that the form of this message is correct, and that $2 \leq \alpha^{R_i} \leq p-1$ and $(\alpha^{R_j})^q=1$ The entity i then computes k'=$H_1$ ($\alpha^{S_iS_j}$), recall that $\alpha^{S_j}$ is j's long term public key, and verifies the authenticated message it received. If so, i accepts, and sends back to j $MAC_k$,$(3,i,j,\alpha^{R_i},\alpha^{R_j})$, Upon receipt of this string, j checks the form of the message, verifies the authenticated message, and accepts. Both parties compute the agreed session key as k=$H_2$ ($\alpha^{R_iR_j}$). If at any stage, a check or verification performed by i or j fails, then that party terminates the protocol run, and rejects.

In practice, entity i may wish to append its identity to the first flow of Protocol 1. We omit this identity because certain applications may desire to identify the entities involved at the packet level rather than the message level—in this instance, identifying i again is therefore superfluous.

Note that entities use two distinct keys in Protocol 1—one key for confirmation and a different key as the session key for subsequent use. In particular, the common practice of using the same key for both confirmation and as the session key may be disadvantageous if this means the same key is used by more than one primitive.

Protocol 1 is different from most proposed AKC protocols in the manner that entities employ their long-term secret values and session-specific secret values. Most proposed protocols use both long-term secrets and short-term secrets in the formation of all keys. In Protocol 1, long-term secrets and short-term secrets are used in quite independent ways. Long-term secrets are used only to form a session-independent confirmation key and short-term secrets only to form the agreed session key. Conceptually, this approach has both advantages and disadvantages over more traditional techniques. On the plus side, the use of long-term keys and short-term keys is distinct, serving to clarify the effects of a key compromise—compromise of a long-term secret is fatal to the security of future sessions, and must be remedied immediately, whereas compromise of a short-term secret effects only that particular session. On the negative side, both entities must maintain a long-term shared secret key k' in Protocol 1.

Protocol 2

Figure 3:
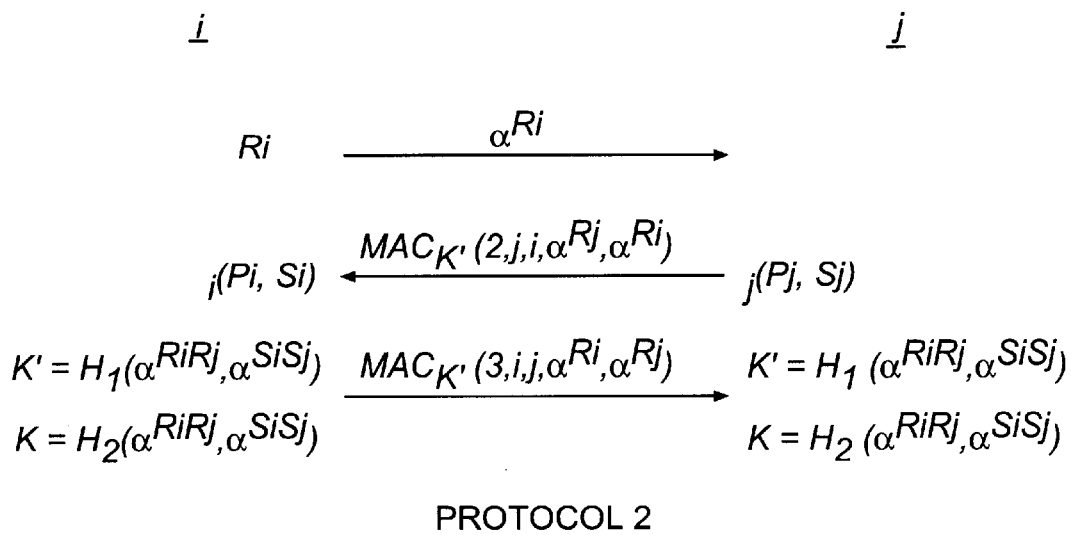

Protocol 2 is an AKC protocol designed to deal with some of the disadvantages of Protocol 1. It is represented graphically in FIG. 3. The actions performed by entities i and j are similar to those of Protocol 1, except that the entities use both their short-term and long-term values in the computation of both the keys they employ. Specifically, the entities use k'=$H_2(\alpha^{R_iR_j}, \alpha^{S_iS_j})$ as their MAC key for this session, and k=$H_2(\alpha^{R_iR_j},\alpha^{S_iS_j})$ as the agreed session key. Unlike Protocol 1, both long-term secrets and both short-term secrets are used in Protocol 2 to form each key. While this makes the effect of a compromise of one of these values less clear, it also means that there is no long-term shared key used to MAC messages in every session between i and j. However, the two entities do still share a long-term secret value $\alpha^{S_iS_j}$. This value must therefore be carefully guarded against compromise, along with $S_i$ and $S_j$ themselves. Conceptually, it is possible to separate the AK phase and the key confirmation phase in Protocol 2.

Figure 4:
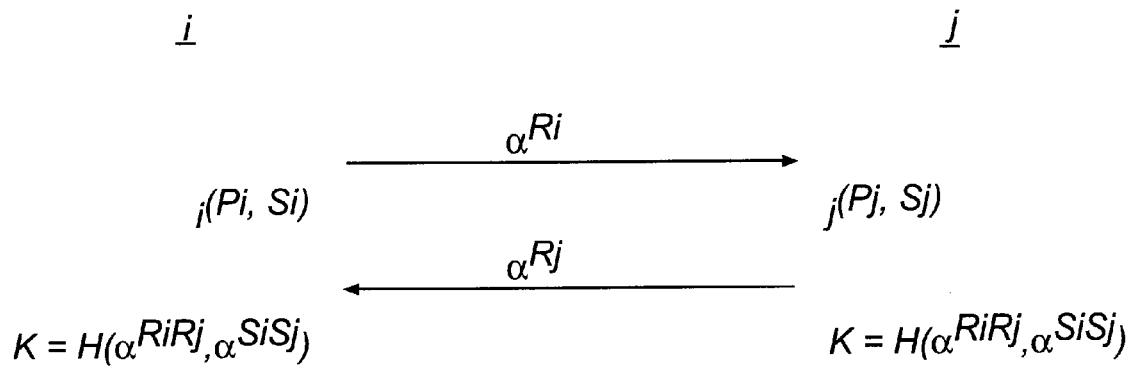

Protocol 3. An embodiment of a secure AK protocol is illustrated in FIG. 4 which shows a graphical representation of the actions taken by i and j in a run of Protocol 3. To see that Protocol 3 is not a secure AK protocol if an adversary can reveal unconfirmed session keys, notice the following attack. E begins two runs of the protocol, one with $\Pi_{i,j}^3$, and one with $\Pi_{i,j}^u$. Suppose $\Pi_{i,j}^3$ sends $\alpha^{R_i}$, and $\Pi_{i,j}^u$ sends $\alpha^{R'_i}$. E now forwards $\alpha^{R_i}$ to $\Pi_{i,j}^u$, and $\alpha^{R'_i}$ to $\Pi_{i,j}^u$. E can now discover the session key k=$H_2(\alpha^{R_iR_j},\alpha^{S_iS_j})$ held by $\Pi_{i,j}^3$ by revealing the (same) key held by $\Pi_{i,j}^u$.

In this protocol, care must be taken when separating authenticated key agreement from key confirmation. Protocol 3 above is not a secure AK protocol in the full model of distributed computing, but can nonetheless be turned into a secure AKC protocol, as in Protocol 2. At issue here is whether it is realistic to expect that an adversary can learn keys that have not been confirmed.

Therefore, in this description we have tried to separate the goals of AK and AKC. A reason we have endeavored to separate authenticated key agreement from key confirmation is to allow flexibility in how a particular implementation chooses to achieve key confirmation. For example, architectural considerations may require key agreement and key confirmation to be separated—some systems may provide key confirmation during a 'real-time' telephone conversation subsequent to agreeing a session key over a computer network, while others may instead prefer to carry out confirmation implicitly by using the key to encrypt later communications.

The reason that we have specified the use of a subgroup of prime order by the DHSs is to avoid various known session key attacks on AK protocols that exploit the fact that a key may be forced to lie in a small subgroup of $Z_p^*$. From the point of view of the security proofs, we could equally well have made assumptions about DHSs defined in $Z_p^*$ rather than a subgroup of $Z_p^*$.

Figure 5:
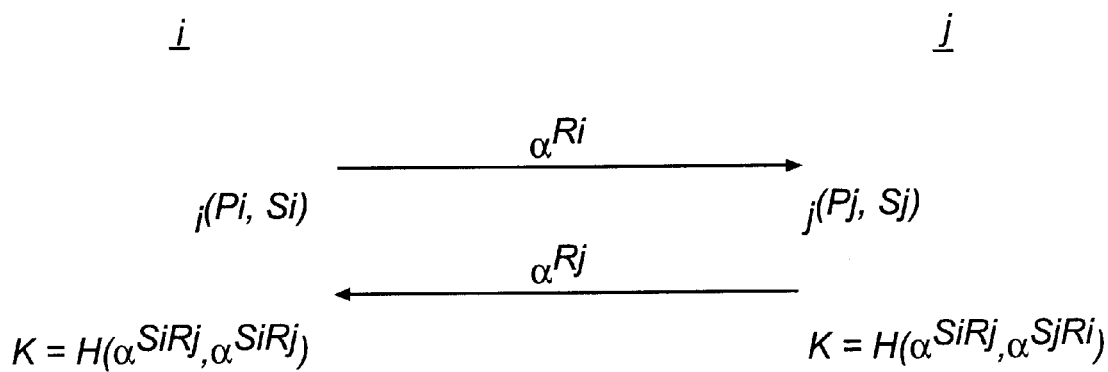

It may be noted in particular that, as is the case with Protocol 3, many previous AK protocols do not contain asymmetry in the formation of the agreed key to distinguish which entity involved is the protocol's initiator, and which is the protocol's responder Protocol 4. Again, in this protocol instead of describing the actions of i and j verbally, we illustrate these actions in FIG. 5. While at first glance, Protocol 4 may look almost identical to the well-known MTI protocol, where the shared value computed is $\alpha^{S_jR_j+S_jR_i}$, notice the following important distinction. Entity i calculates a different key in Protocol 4 depending on whether i believes it is the initiator or responder. In the first case, i computes k=$H_2(\alpha^{S_iR_j}, \alpha^{S_jR_i})$, and in the second case k=$H_2(\alpha^{S_jR_i}, \alpha^{S_iR_j})$. As we noted above, such asymmetry is desirable in a secure AK protocol. Of course, such asymmetry is not always desirable—a particular environment may require that i calculate the same key no matter whether i is the initiator or responder.

If indeed it can be shown that Protocol 4 is a secure AK protocol, then it can be turned into a secure AKC protocol in the same spirit as Protocol 2.

One issue is how to instantiate the random oracles $H_1$ and $H_2$. A hash function such as SHA-1 should provide sufficient security for most applications. It can be used in various ways to provide instantiations of independent random oracles. For example, an implementation of Protocol 1 may choose to use:

$$H_1(x):=SHA-1(01,x) \text{ and } H_2(x):=SHA-1(10,x).$$

A particularly efficient instantiation of the random oracles used in Protocol 2 is possible using SHA-1 or RIPEMD-160. Suppose 80-bit session keys and MAC keys are required. Then the first 80 bits of SHA-1($\alpha^{R_iR_j}, \alpha^{S_iS_j}$) can be used as k' and the second 80 bits used as k. Of course, such efficient implementations may not offer the highest conceivable security assurance of any instantiation.

It is easy to make bandwidth savings in implementations of the AKC protocols. Instead of sending the full authenticated messages (m,$\alpha$) in flows 2 or 3, in both cases the entity can omit much of m, leaving the remainder of the message to be inferred by its recipient.

In some applications, it may not be desirable to carry out a protocol run each time a new session key is desired. Considering specifically Protocol 2 by way of example, entities may wish to compute the agreed key as:

$$H_2(\alpha^{R_iR_j}, \alpha^{S_iS_j}, \text{counter}).$$

Then, instead of running the whole protocol each time a new key is desired, most of the time the counter is simply incremented. Entities need then only to resort to using the protocol itself every now and then to gain some extra confidence in the 'freshness' of the session keys they're using.

In Protocols 1, 2, and 3, performance and security reasons may make it desirable to use a larger (and presumably more secure) group for the static. Diffie-Hellman number ($\alpha_1^{S_iS_j}$) than for the ephemeral Diffie-Hellman number ($\alpha_2^{R_iR_j}$) calculation. The larger group is desirable because the static number will be used more often. The static numbers may be cached to provide a speed up in session key calculation.

Finally, note that a practical instantiation of G (assume G generates key pairs for each entity) using certificates should check knowledge of the secret value before issuing a certificate on the corresponding public value. We believe that this is a sensible precaution in any implementation of a Certification Hierarchy.

While the invention has been described in connection with the specific embodiment thereof, and in a specific use, various modifications thereof will occur to those skilled in the art without departing from the spirit of the invention as set forth in the appended claims. For example, each entity will usually generate key pairs itself and then get them certified by a certification authority.

The terms and expressions which have been employed in this specification are used as terms of description and not of limitations, there is no intention in the use of such terms and expressions to exclude any equivalence of the features shown and described or portions thereof, but it is recognized that various modifications are possible within the scope of the claims to the invention.

The Embodiments of the invention in which an exclusive property or privilege is claimed are defined as follows:

1. A key agreement method between a pair of entities i and j in a digital data communication system, wherein each said entity has a private and corresponding public key pairs $S_i$, $P_i$ and $S_j$, $P_j$ respectively and the system, having global parameters for generating elements of a group, said method comprising the steps of:

(a) entity i selecting a random private session value $_1$;

(b) forwarding a public session value corresponding to said private session value $R_i$ to said entity j;

(c) entity j computing a long term shared secret key k' derived from entity i's public key and j's private key utilizing a first function $H_1$;

(d) said entity j utilizing said key k' and computing an authenticated message on entity identities i, and entities j public session values and forwarding said authenticated message to entity i;

(e) said entity i verifying said received authenticated message;

(f) said entity i computing said long term shared secret key k' derived from said entity j's public key and i's private key in accordance with said first function $H_1$;

(g) said entity i utilizing said long term shared secret key k' and computing an authenticated message on said entities i and j identity information and said entities' public session keys and forwarding said authenticated message to said entity j;

(h) entity j verifying said received authenticated message; and upon both said entities i and j verifying said authenticated messages, computing a short term shared secret key utilizing a respective entity's session public and private keys.

* * * * *

UNITED STATES PATENT AND TRADEMARK OFFICE
CERTIFICATE OF CORRECTION

PATENT NO. : 6,336,188 B2
DATED : January 1, 2002
INVENTOR(S) : Simon Blake-Wilson et al.

It is certified that error appears in the above-identified patent and that said Letters Patent is hereby corrected as shown below:

<u>Title page,</u>
Item [57], ABSTRACT,
Line 2, after "digital", insert -- data --;
Line 2, "each the entity" should read -- each of the entities --;
Line 13, "the key'" should read -- the key k' --; and
Line 16, "aunthenticated" should read -- authenticated --.

Signed and Sealed this

Eighth Day of October, 2002

Attest:

Attesting Officer

JAMES E. ROGAN
Director of the United States Patent and Trademark Office

UNITED STATES PATENT AND TRADEMARK OFFICE
CERTIFICATE OF CORRECTION

PATENT NO. : 6,336,188 B2
DATED : January 1, 2002
INVENTOR(S) : Simon Blake-Wilson et al.

It is certified that error appears in the above-identified patent and that said Letters Patent is hereby corrected as shown below:

<u>Column 6,</u>
Lines 28-60, should read:

-- 1. A key agreement method between a pair of entities i and j in a digital data communication system, wherein each of said pair of entities has an entity identity and a private and corresponding public key pair $S_i, P_i$ and $S_j, P_j$ respectively, and the system having global parameters for generating elements of a group, said method comprising the steps of:

(a) the entity i selecting a private session value $R_i$;

(b) (b) said entity i forwarding a public session value $Q_i$ corresponding to said private session value $R_i$, to the entity j;

(c) said entity j computing a long term shared secret key k' derived from the entity i's public key $P_i$ and the entity j's private key $S_j$, the computation utilizing a first function $H_1$;

(d) said entity j utilizing the key k' for computing a first authenticated message on the entity identities of i and j, the public session value $Q_i$ of entity i, and a public session value $Q_j$ of entity j corresponding to a private session value $R_j$ of entity j;

(e) said entity j forwarding said first authenticated message to entity i;

(f) said entity i verifying said first authenticated message;

(g) said entity i computing said key k', the key k' derived from the entity j's public key $P_j$ and the entity i's private key $S_i$ in accordance with said first function $H_1$;

UNITED STATES PATENT AND TRADEMARK OFFICE
CERTIFICATE OF CORRECTION

PATENT NO. : 6,336,188 B2
DATED : January 1, 2002
INVENTOR(S) : Simon Blake-Wilson et al.

It is certified that error appears in the above-identified patent and that said Letters Patent is hereby corrected as shown below:

<u>Column 6 cont'd,</u>

(h) said entity i utilizing said key k' for computing a second authenticated message on the entity identities of i and j and the entities' public session values, $Q_i$ and $Q_j$, and forwarding said second authenticated message to said entity j;

(i) said entity j verifying said second authenticated message; and (j) said entity i computing a short term shared secret key k, the computation of the key k utilizing the entity i's private session value $R_i$ and the entity j's public session value $Q_j$ obtained from said first authenticated message;

(k) said entity j computing the key k, the computation of the key k by entity j utilizing the entity j's private session value $R_j$ and the entity i's public session value Qi obtained from said second authenticated message;

whereby said pair of entities i and j agree on the key k for use in the digital data communication system. --

Signed and Sealed this

Fifth Day of August, 2003

JAMES E. ROGAN
*Director of the United States Patent and Trademark Office*